United States Patent
Wang et al.

(10) Patent No.: US 12,001,596 B2
(45) Date of Patent: Jun. 4, 2024

(54) TRANSACTION SECURITY PROCESSING METHOD AND APPARATUS, AND TERMINAL DEVICE FOR USING A TRUSTED APPLICATION IN ASSOCIATION WITH AN AUDIO FILE

(71) Applicant: HUAWEI TECHNOLOGIES CO., LTD., Guangdong (CN)

(72) Inventors: Xiaochu Wang, Beijing (CN); Peng Zhang, Shenzhen (CN); Gaosheng Yin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 266 days.

(21) Appl. No.: 17/359,846

(22) Filed: Jun. 28, 2021

(65) Prior Publication Data

US 2021/0326492 A1    Oct. 21, 2021

Related U.S. Application Data

(63) Continuation of application No. PCT/CN2019/128451, filed on Dec. 25, 2019.

(30) Foreign Application Priority Data

Dec. 29, 2018    (CN) .......................... 201811643260.5

(51) Int. Cl.
*G06F 21/84*    (2013.01)
*G06F 21/53*    (2013.01)
(Continued)

(52) U.S. Cl.
CPC .............. *G06F 21/84* (2013.01); *G06F 21/53* (2013.01); *G06F 21/54* (2013.01); *G06F 21/556* (2013.01); *G06F 21/602* (2013.01)

(58) Field of Classification Search
CPC .......... G06F 21/84; G06F 21/53; G06F 21/54; G06F 21/556; G06F 21/602;
(Continued)

(56) References Cited

U.S. PATENT DOCUMENTS 8,433,924 B2 *    4/2013    Challener ............... G06F 21/57
                                                        713/188
2004/0123118 A1 *    6/2004    Dahan ..................... G06F 21/74
                                                        712/E9.082

(Continued)

FOREIGN PATENT DOCUMENTS

CN    105528554 A    4/2016
CN    105791284 A    7/2016
(Continued)

OTHER PUBLICATIONS

International Search Report and Written Opinion issued in PCT/CN2019/128451, dated Mar. 23, 2020, 10 pages.

(Continued)

*Primary Examiner* — Theodore C Parsons

(57) ABSTRACT

The technology of this application relates to a transaction security processing method and apparatus, and a terminal device. The method includes receiving, in a rich execution environment (REE), a screen jump instruction triggered by a user in a first screen, where the screen jump instruction is used for jumping to a second screen, and the second screen can be displayed in a trusted execution environment (TEE), and entering the TEE and loading a trusted application (TA) in the TEE. The method further includes obtaining a first audio file from storage space on an REE side and playing the first audio file by using the TA, where the first audio file is used to represent that the terminal device is currently running in a trusted environment, and displaying the second screen generated by using the TA.

20 Claims, 15 Drawing Sheets

(51) Int. Cl.
*G06F 21/54* (2013.01)
*G06F 21/55* (2013.01)
*G06F 21/60* (2013.01)

(58) Field of Classification Search
CPC .............. G06F 2221/031; G06F 3/165; G06Q 20/3227; G06Q 20/326; G06Q 20/3272; G06Q 20/3829; G06Q 20/401; G09B 21/006
See application file for complete search history.

(56) References Cited

U.S. PATENT DOCUMENTS

| | | | |
|---|---|---|---|
| 2007/0038997 A1* | 2/2007 | Grobman | G06F 21/10 718/1 |
| 2014/0093083 A1* | 4/2014 | Dadu | G06F 21/32 380/275 |
| 2016/0210477 A1 | 7/2016 | Lee et al. | |
| 2016/0217467 A1 | 7/2016 | Smets et al. | |
| 2016/0247144 A1* | 8/2016 | Oh | G06K 7/083 |
| 2016/0328602 A1 | 11/2016 | Zuo et al. | |
| 2017/0103378 A1* | 4/2017 | Pan | G06Q 20/3229 |
| 2017/0148017 A1 | 5/2017 | Hu et al. | |
| 2018/0082085 A1* | 3/2018 | Yau | G06F 21/74 |
| 2018/0089690 A1 | 3/2018 | Wan et al. | |
| 2018/0240123 A1 | 8/2018 | Jin et al. | |
| 2018/0276352 A1 | 9/2018 | Yao | |
| 2018/0367989 A1 | 12/2018 | Zhu et al. | |

FOREIGN PATENT DOCUMENTS

| | | |
|---|---|---|
| CN | 106713604 A | 5/2017 |
| CN | 107451813 A | 12/2017 |
| CN | 108229956 A | 6/2018 |
| CN | 107924449 B | 3/2020 |
| EP | 3370449 A1 | 9/2018 |
| WO | 2016192842 A1 | 12/2016 |
| WO | 2017147890 A1 | 9/2017 |

OTHER PUBLICATIONS

Office Action for Chinese Application No. 201811643260.5 dated Feb. 28, 2023, 23 pages.
Kailiang Ying et al., "TruZ-Droid: Integrating TrustZone with Mobile Operating System", MobiSys '18, Jun. 10-15, 2018, Munich, Germany, total 14 pages.
Extended European Search Report for Application No. 19901975.3 dated Dec. 7, 2021, total 12 pages.
Notice of Allowance for Chinese Application No. 201811643260 dated Aug. 1, 2023, 5 pages.

* cited by examiner

CONT. FROM FIG. 1A

Password input screen

TRANSACTION SECURITY PROCESSING METHOD AND APPARATUS, AND TERMINAL DEVICE FOR USING A TRUSTED APPLICATION IN ASSOCIATION WITH AN AUDIO FILE

CROSS-REFERENCE TO RELATED APPLICATIONS

This application is a continuation of International Application No. PCT/CN2019/128451, filed on Dec. 25, 2019, which claims priority to Chinese Patent Application No. 201811643260.5, filed on Dec. 29, 2018. The disclosures of the aforementioned applications are hereby incorporated by reference in their entireties.

TECHNICAL FIELD

Embodiments of this application relate to the communications field, and in particular, to a transaction security processing method and apparatus, and a terminal device.

BACKGROUND

With continuous popularity of terminal devices, performing mobile payment by using the terminal devices becomes a preferred payment mode of an increasing quantity of users. How to ensure security of mobile payment is an important problem to be resolved in the mobile payment field.

In the prior art, a method for improving mobile transaction security is proposed. When a user needs to perform operations such as mobile payment and transfer, a terminal device runs in a trusted environment and a password input screen is drawn in the trusted environment, and at the same time, the terminal device displays preset security prompt information at a specific location of the password input screen, to give a prompt to the user that the user has entered the trusted environment currently. The user may further enter a payment password to complete mobile payment, transfer, and the like.

However, when the prior-art method is used, an attacker may forge a password input screen and security prompt information to steal a payment password of a user. Therefore, the prior-art method still has a disadvantage in terms of security.

SUMMARY

A first aspect of embodiments of this application provides a transaction security processing method.

In the method, a terminal device receives, in a rich execution environment (REE), a screen jump instruction triggered by a user on a first screen, where the screen jump instruction is used for jumping to a second screen, and further, the terminal device loads a trusted application (TA) in a trusted execution environment (TEE). After the TA is loaded, the terminal device may obtain a first audio file from storage space on an REE side and play the first audio file by using the TA, and then, display the second screen generated by using the TA. The first audio file is used to represent that the terminal device is currently running in a trusted environment.

In the method, after receiving the instruction triggered by the user for jumping to a password input screen, the terminal device may load the TA on a TEE side, and obtain an audio file from the REE and play the audio file by using the TA, to give a prompt to the user that the terminal device is currently running in a trusted environment. Because content of the audio file is recorded or stored by the user, and content of audio files of terminal devices is different from each other (or has a great probability of being different), it is very difficult for an attacker to forge the audio file. In addition, even if the audio file can be forged, it is necessary to perform the forging for each terminal device. Therefore, an attack is also costly. Moreover, when the audio file is of a human sound, a voiceprint feature of the human sound is unique and costs of the attack are even higher. Therefore, according to the method in this embodiment of this application, difficulty in performing an attack during mobile payment can be greatly increased, a possibility of being attacked in a mobile payment scenario can be greatly reduced, and further, security of the mobile payment can be improved. In addition, in this embodiment, the user is reminded, by playing the audio, that the terminal device is currently running in a trusted environment. Therefore, for special users such as blind users, trustworthiness of the password input screen may also be confirmed by using the method in this embodiment.

In a possible implementation, before obtaining the first audio file from the storage space on the REE side and playing the first audio file by using the TA, the terminal device may further adjust a mode of an audio output device of the terminal device to a first mode by using the TA, and control, by using the TA, the audio output device to play the first audio file. When the audio output device is in the first mode, the audio output device is controlled by using the TA.

In the method, before the audio file is obtained and played, a right to use the audio output device is obtained by adjusting the mode of the audio output device to a secure mode. When the audio output device is in the secure mode, an application on the REE side cannot invoke the audio output device to play audio. This further prevents the attacker from forging an audio file to play, and further improves security during the mobile payment.

In this possible implementation, the terminal device may invoke a first interface by using the TA, to adjust the mode of the audio output device of the terminal device to the first mode. The first interface includes an interface in the REE.

In a possible implementation, the terminal device may invoke the first interface by using the TA, to obtain the first audio file from the storage space on the REE side.

In a possible implementation, the terminal device may obtain an encrypted first audio file from the storage space on the REE side by using the TA. Correspondingly, when the terminal device plays the first audio file, the encrypted first audio file may be decrypted by using the TA by using a key stored on the TEE side, to obtain the decrypted first audio file, and the decrypted first audio file is then played by using the TA.

In a possible implementation, after displaying the password input screen generated by using the TA, the terminal device may further adjust the mode of the audio output device of the terminal device to a second mode by using the TA. When the audio output device is in the second mode, the audio output device is controlled by using a client application (CA) running in the REE.

In a possible implementation, the terminal device may further receive, by using the TA, audio information that is entered by a first user and that is collected by the audio input device. In this case, the audio input device is in the first mode. Then, the terminal device generates the first audio file based on the audio information by using the TA, and saves the first audio file to the storage space on the REE side by using the TA.

In this possible implementation, when saving the first audio file to the storage space on the REE side by using the TA, the terminal device may invoke the first interface by using the TA, to save the first audio file to the storage space on the REE side.

In this possible implementation, before saving the first audio file to the storage space on the REE side, the terminal device encrypts the first audio file by using the TA by using the key, to obtain the encrypted first audio file, saves the key to the storage space on the TEE side by using the TA, and saves the encrypted first audio file to the storage space on the REE side.

In a possible implementation, an audio feature of the first audio file is a voice feature of the user.

A second aspect of the embodiments of this application provides a transaction security processing apparatus. The apparatus may be a terminal device, or may be an apparatus that can support the terminal device in performing corresponding functions performed by the terminal device in the implementation example of the first aspect. For example, the apparatus may be an apparatus in the terminal device or a chip system. The apparatus may include a receiving module and a processing module, and these modules may perform the corresponding functions performed by the terminal device in the implementation example of the first aspect. Details are as follows:

The receiving module can run in an REE of the terminal device, and is configured to receive a screen jump instruction triggered by a user on a first screen, where the screen jump instruction is used for jumping to a second screen.

The processing module can run in a TEE of the terminal device, and is configured to: load a TA, and obtain a first audio file from storage space on the REE side and play the first audio file by using the TA, where the first audio file is used to represent that the terminal device is currently running in a trusted environment; and display the second screen generated by using the TA.

In a possible implementation, for a specific processing process of the processing module, refer to specific descriptions in the first aspect. This is not specifically limited herein.

A third aspect of the embodiments of this application provides a terminal device. The terminal device includes a processor, configured to implement functions of the terminal device in the method described in the first aspect. The terminal device may further include a memory, configured to store a program instruction and data. The memory is coupled to the processor, and the processor may invoke and execute the program instruction stored in the memory, to implement the functions of the terminal device in the method described in the first aspect. The terminal device may further include a communications interface, and the communications interface is used by the terminal device to communicate with another device. For example, the another device is a network device.

In a possible implementation, the terminal device includes:

the communications interface;

the memory, configured to store the program instruction; and the processor, configured to: receive, in an REE, a screen jump instruction triggered by a user on a first screen, where the screen jump instruction is used for jumping to a second screen, load a TA in a TEE, and obtain a first audio file from storage space on the REE side and play the first audio file by using the TA; and display the second screen generated by using the TA.

In a possible implementation, for a process in which the processor obtains the first audio file and plays the first audio file, refer to specific descriptions in the first aspect. This is not specifically limited herein.

A fourth aspect of the embodiments of this application provides a chip system. The chip system includes a processor, may further include a memory, and may further include a communications interface, configured to implement functions of the terminal device in the foregoing method. The chip system may include a chip, or may include a chip and another discrete device.

A fifth aspect of the embodiments of this application provides a computer program product, where the computer program product includes computer program code, and when the computer program code is executed by a computer, the computer is enabled to perform the method according to the first aspect.

A sixth aspect of the embodiments of this application provides a computer-readable storage medium, where the computer readable storage medium stores a computer instruction, and when the computer instruction is executed by a computer, the computer is enabled to perform the method according to the first aspect.

DESCRIPTION OF EMBODIMENTS

Figure 1A:
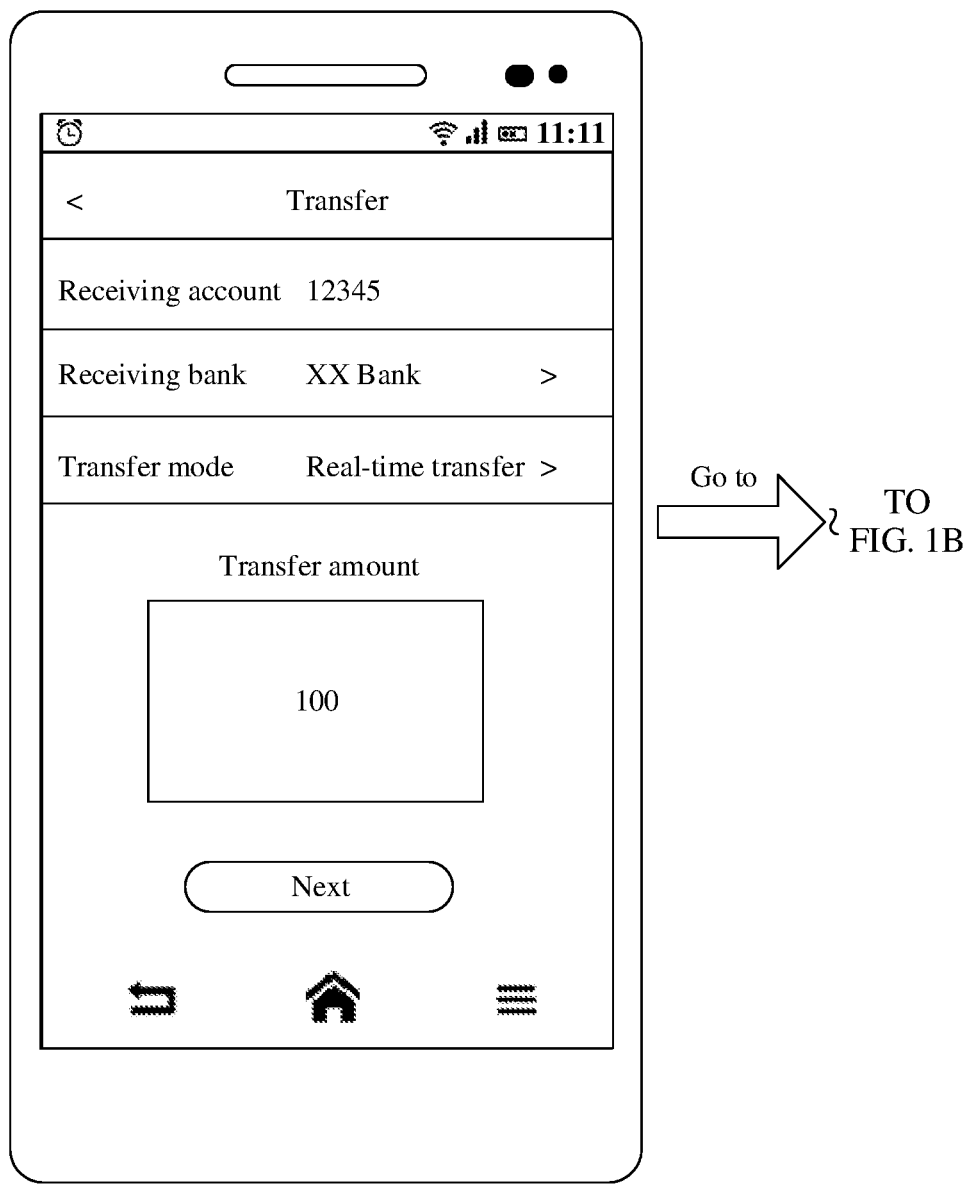
FIG. 1A and FIG. 1B are example schematic diagrams of screen interaction in a scenario in which transfer is performed by using a terminal device in the related art.
Figure 1B:
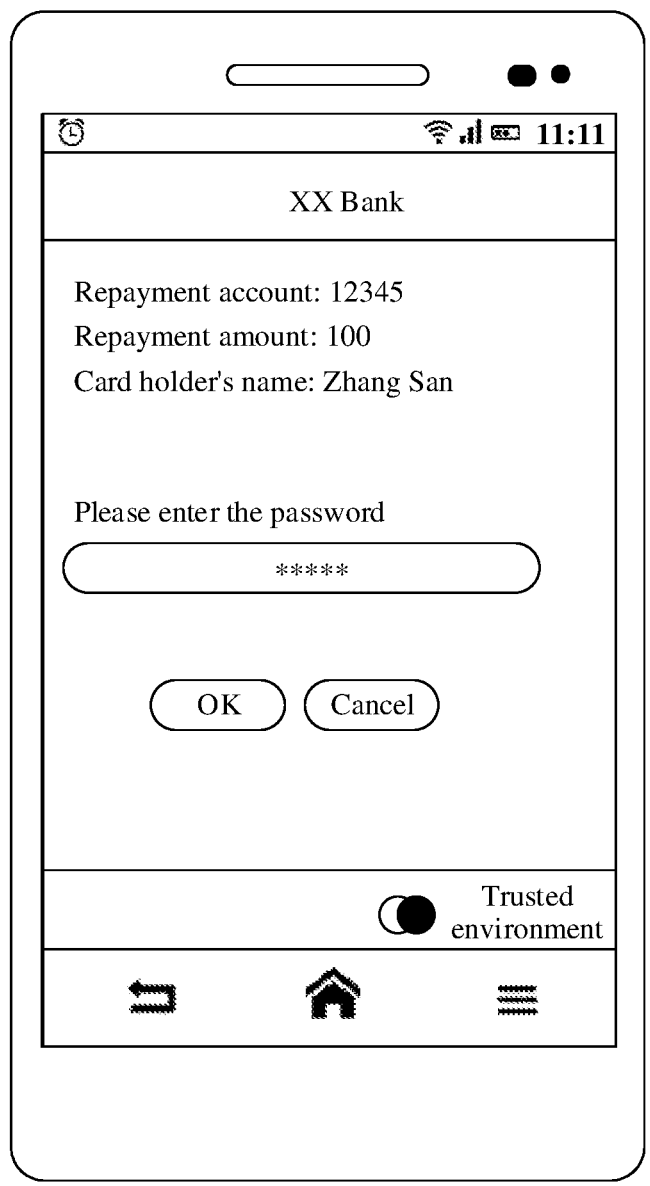

FIG. 1A and FIG. 1B are a schematic diagram of screen interaction in a scenario of performing transferring by using a terminal device in the related art. As shown in FIG. 1A, a user selects a charge receiving account and a charge receiving bank on a transfer screen of a bank client, and enters a transfer amount. Then, the user taps a "Next" button at the bottom of the transfer screen to trigger entering of a password input screen. Display on the transfer screen and interaction with the user are performed by using a client application running in a rich execution environment. After the user taps a "Next" button, the CA invokes a trusted application that runs in a trusted execution environment, and the TA draws a display control of the password input screen and the like, and displays the password input screen. In addition, as shown in FIG. 1B, the TA displays security prompt information in the lower right of the displayed password input screen. The security prompt includes a security icon and characters, and is used to remind the user that the terminal device is currently running in a trusted environment, and the user can enter a password at ease.

In the foregoing method, a password input screen is drawn and displayed in the TEE, and the security prompt information is displayed on the password input screen to ensure payment security and gain trust of the user. However, in the foregoing method, the password input screen and the security prompt information displayed by the terminal device for all users are the same. An attacker may exploit this feature to forge the password input screen and the security prompt information in the REE, so as to achieve an illegal purpose such as stealing a payment password of the user. Therefore, the foregoing method still has disadvantages in security. In addition, for some special users (e.g., blind users), trustworthiness of the password input screen cannot be confirmed by using the foregoing method.

The method provided in this application is intended to resolve the foregoing problem.

It should be noted that the method provided in this application may not only be applied to the mobile transfer scenario shown in FIG. 1A and FIG. 1B, but also may be applied to scenarios such as mobile payment, login to an application in the terminal device, and unlocking the terminal device. This is not specifically limited in the embodiments of this application.

Figure 2:
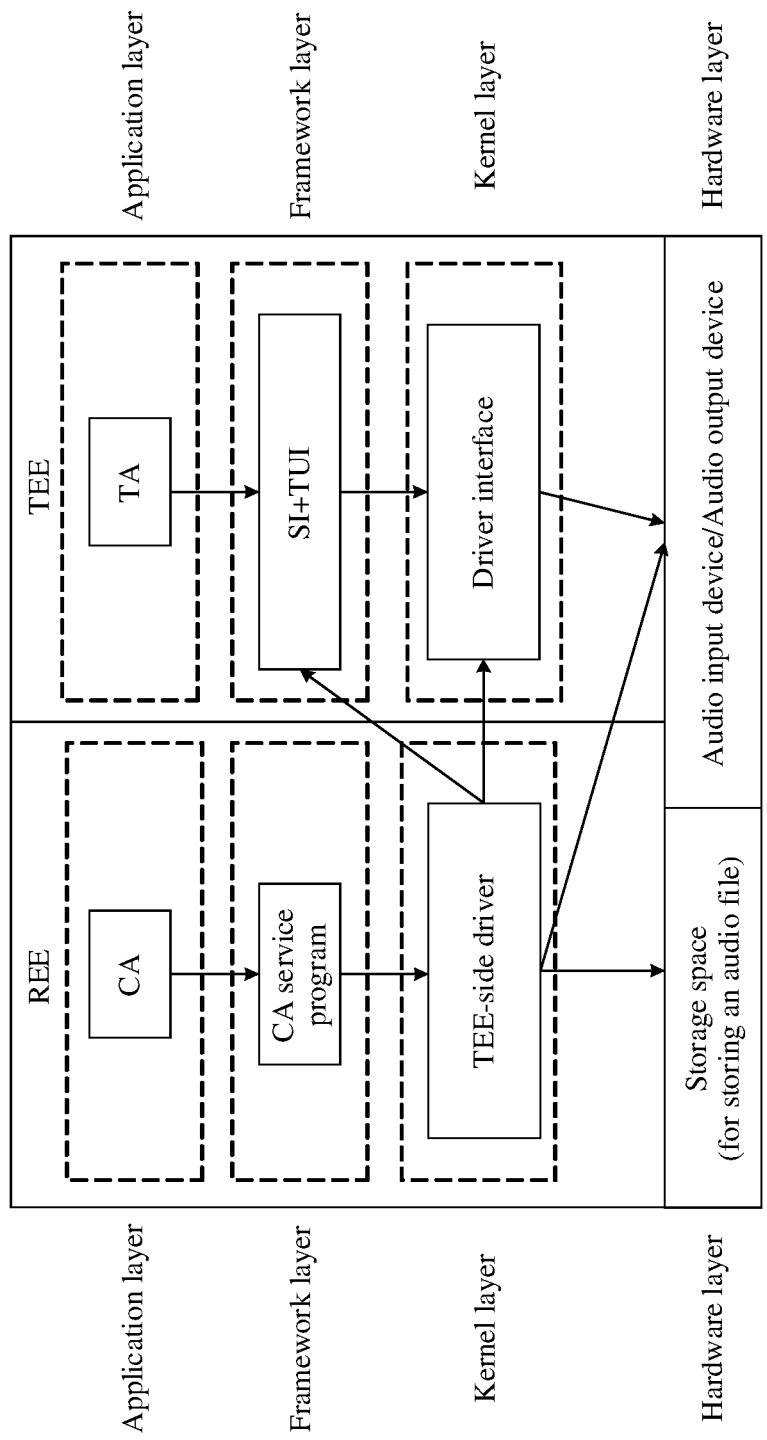
FIG. 2 is an example system architecture diagram of a transaction security processing method according to an embodiment of this application.

FIG. 2 is a system architecture diagram of a transaction security processing method according to this application. As shown in FIG. 2, the method may be applied to a terminal device. The terminal device may be a mobile device or a fixed device, in one example, may be a mobile phone (or referred to as a "cellular" phone), a smartphone, a self-service payment terminal, or a near field communication device, in another example, may be an in-vehicle device, or a wearable device, or in still another example, a personal digital assistant (PDA), an artificial intelligence device, a virtual reality/augmented reality/mixed reality device, a terminal in a future 5G network, or a terminal device in a future evolved public land mobile network (PLMN). This is not limited in this embodiment of this application.

The terminal device includes an REE and a TEE, where the REE is based on an REE operating system, and the TEE is based on a TEE operating system. An REE side and a TEE side separately include an application layer, a framework layer, and a kernel layer from top to bottom. In addition, a hardware layer is further included below the kernel layer, and the hardware layer may act on both the REE side and the TEE side.

On the REE side, the application layer includes a CA. For example, the CA may be, for example, a bank application (APP). The framework layer includes a CA service program, where the CA service program is used to transfer a command and information of the CA to a TEE-side driver at the kernel layer. The kernel layer includes the TEE-side driver. In this embodiment of the present technology, the TEE-side driver is configured to load an audio file, configure a hardware module to the TEE side, transfer the command and the information of the CA to the TEE side, and so on. The audio file is a file that is recorded by a user and that is used to play before a password input screen is displayed.

On the TEE side, the application layer includes a TA. The framework layer includes a trusted user interface (TUI) and a security (or safety) indication (SI). The TA may invoke the TUI to display a secure password input screen. In addition, the TA may invoke the SI by using the TUI, and the SI invokes a driver interface of an audio output device, so that security prompt information in an audio form is played before the password input screen is displayed. The TA may further invoke, by using the SI, a driver interface of an audio input device, to receive audio information recorded by the user. The kernel layer includes the driver interface of the audio input device and the driver interface of the audio output device that are invoked by the SI to play the security prompt information or receive the audio information recorded by the user, before a password input screen is displayed.

A hardware layer is below each of the kernel layer on the REE side and the kernel layer on the TEE side. The hardware layer includes the audio input device and the audio output device, where the audio input device may be a microphone, and the audio output device may be a speaker. In this embodiment of this application, the REE may be controlled to obtain a right to use the audio input device and/or the audio output device, or the TEE may be controlled to obtain a right to use the audio input device and/or the audio output device. An example in which the TEE obtains the right to use the audio output device is used. After obtaining the right to use the audio output device, the TEE can invoke, from the TA, the audio output device from top to bottom, and then play, by using the audio output device, an audio file pre-recorded by the user. In addition, the hardware layer further includes specific secure storage space. In this embodiment of this application, the secure storage space is used to store the foregoing audio file.

Based on the foregoing system architecture, in this embodiment of this application, after receiving an instruction triggered by the user for jumping to the password input screen, the terminal device may load the TA on the TEE side, and the TA invokes the TEE-side driver running on the REE side, and obtains, from the REE by using the TEE-side driver, an audio file pre-entered or pre-stored by the user. After obtaining the audio file, the TA invokes the SI by using the TUI, the SI invokes the driver interface of the audio output device, and the driver interface controls the audio output device to play the audio file, to give a prompt to the user that the terminal device is currently running in a trusted environment. Then, the TA draws and displays the password input screen. Because content of the audio file is recorded or stored by the user, and content of audio files of terminal devices is different from each other (or has a greater probability of being different), it is very difficult for an attacker to forge the audio file. In addition, even if the audio file can be forged, it is necessary to perform the forging for each terminal device. Therefore, an attack is also costly. Moreover, when the audio file is of a human sound, a voiceprint feature of the human sound is unique and costs of the attack are higher. Therefore, according to the method in this embodiment of this application, difficulty in performing an attack during mobile payment can be greatly increased, a possibility of being attacked in a mobile payment scenario can be greatly reduced, and further, security of the mobile payment can be improved.

Further, in this embodiment of this application, before obtaining and playing the audio file, the TA may adjust a mode of the audio output device to a first mode. In the first mode, the audio output device can be controlled only by using the TA. Therefore, the first mode is a secure mode. When the audio output device is in the secure mode, an application on the REE side cannot invoke the audio output device to play audio, thereby further preventing the attacker from forging the audio file to play, and further improving the security of the mobile payment.

Further, in this embodiment of this application, before an audio file that is pre-recorded by the user and that has a voice feature of the user is obtained from the REE and is played by using the TA, a process of recording the audio file may be first performed. In this process, security may be further ensured by adjusting a mode of the audio input device, encrypting and storing the audio file, or in other manners.

The following embodiments of this application separately describe solutions in the embodiments of this application in at least two aspects: playing an audio file and pre-recording an audio file in a mobile transaction process.

The following describes a processing process for a mobile transaction.

Figure 3:
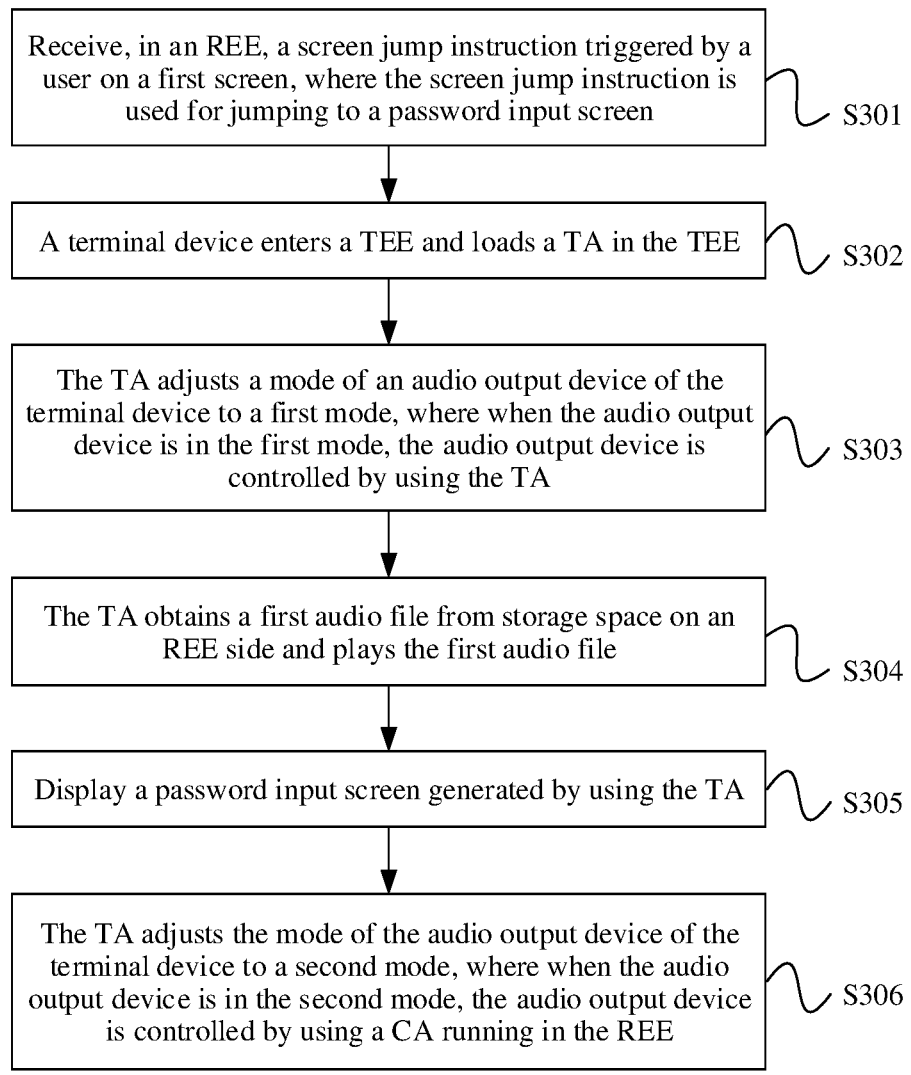
FIG. 3 is an example schematic flowchart of a method for implementing a secure transaction according to an embodiment of this application.

FIG. 3 is a schematic flowchart of a method for implementing a secure transaction according to this application. The method can be executed by a terminal device. As shown in FIG. 3, the method includes the following steps.

S301. Receive, in an REE, a screen jump instruction triggered by a user on a first screen, where the screen jump instruction is used for jumping to a password input screen.

The first screen may be a payment screen, or the transfer screen shown in FIG. 1A, or another screen on which jumping can be triggered to the password input screen. This is not specifically limited in this embodiment of this application.

In an example scenario, a user A wants to transfer money to a user B by using a bank client installed on a mobile phone, and the bank client is a CA. After opening the bank client, the user may tap a "Transfer" button on a home page of the client, the CA then displays a transfer screen (equivalent to the first screen), information such as a charge collection account number of the user B and a transfer amount is entered in the transfer screen, and then a "Next" button is tapped, to instruct the terminal device to jump to the password input screen, where the operation of the tapping is equivalent to the screen jump instruction.

S302. The terminal device enters a TEE, and loads a TA in the TEE.

After receiving the screen jump instruction, the CA loads, by using a preset standard interface, the TA running in the TEE. The TA starts to run immediately after being loaded.

Specifically, referring to FIG. 2, the CA may invoke the TEE-side driver to transfer an instruction for loading a TA to the TEE side (the terminal device then enters the TEE). After the instruction for loading the TA from the CA is received on the TEE side, the TA is started.

S303. The TA adjusts a mode of an audio output device of the terminal device to a first mode, where when the audio output device is in the first mode, the audio output device is controlled by using the TA.

In the first mode, the audio output device is controlled only by using the TA, and the CA on the REE side cannot control the audio output device. Therefore, the first mode is a secure mode. In this secure mode, an attacker may be prevented from a behavior of forging an audio file to play.

Specifically, the TA may invoke a first interface to adjust the mode of the audio output device of the terminal device to the first mode.

The first interface is the TEE-side driver shown in FIG. 2. Specifically, the TA invokes the TEE-side driver to adjust the mode of the audio output device to the first mode (in other words, the audio output device is configured to the TEE side), and the TA on the TEE side controls the audio output device.

Further, after completing the adjustment of the mode of the audio output device, the TEE-side driver may return an invocation result of successful adjustment to the TA, or may send error information only when the adjustment fails, or may not send information. This is not limited in this embodiment.

S304. The TA obtains a first audio file from storage space on the REE side and plays the first audio file. The first audio file is used to represent that the terminal device is currently running in a trusted environment, in other words, playing of the first audio file represents that the terminal device is currently running in a trusted environment.

In some implementations, the first audio file is recorded by the user by using an audio input device (for example, a microphone) of the terminal device, and the recorded audio file may be a sound of an owner of the terminal device, or may be a sound of another person, a sound of an animal, or a sound of another sound-emitting object.

In some other implementations of the terminal device, the first audio file is an audio file selected and stored by the user, and is not recorded by the user by using the audio input device of the terminal device. For example, the first audio file may be a sound of the user or another person recorded by the user on another device, a song, or the like.

The terminal device saves the first audio file to the storage space on the REE side. A process of pre-recording and pre-storing the first audio file is described in detail in embodiment 2 below.

Specifically, the TA may invoke the first interface to obtain the first audio file from the storage space on the REE side. More specifically, the TA invokes the TEE-side driver to load the first audio file from the storage space on the REE side to the TEE side, and the TA invokes the audio output device to play. Because the mode of the audio output device has been adjusted to the first mode in step S303, the TA may invoke the audio output device.

In an implementation, referring to FIG. 2, on the TEE side, a framework layer includes an SI below the TA. When the TA needs to control the audio output device to play the first audio file, the TA may invoke the SI by using a TUI, and the SI invokes a driver interface of the audio output device at a kernel layer. The driver interface controls the audio output device to play the first audio file. In another implementation, the TA may alternatively directly invoke the driver interface to control the audio output device to play the first audio file.

Further, to ensure security of an audio recorded by the user, the TA may encrypt an audio file, save, on the TEE side, a key generated during the encryption, and then save the encrypted audio file to the storage space on the REE side. In this case, the first audio file obtained by the TA from the storage space on the REE side is the encrypted audio file. Correspondingly, when playing the first audio file, the TA needs to first obtain a key, decrypts the encrypted first audio file based on the key to obtain the decrypted first audio file, and then plays the decrypted first audio file.

S305. Display the password input screen generated by using the TA.

FIG. 3 is merely an example of a method execution sequence. For example, the TA may jump from the foregoing first screen to a screen dedicated to playing the first audio file, and jump from the screen to the password input screen after the playing is completed, in other words, the audio file is first played and then the password input screen is displayed. The user may be allowed to perform operations such as suspension, fast forwarding, and pause in a process of playing the audio file. After receiving a suspension instruction of the user, the terminal device may immediately jump to the password input screen.

In another optional manner, the TA may first display the password input screen to the user, and after the displaying, obtain the first audio file from the REE side and play the first audio file (referring to step S304). In a process of playing the first audio file, the user may not be allowed to enter a password on the password input screen. The user may choose to suspend playing of the first audio file before the playing of the first audio file is completed, and then enter a password.

Specifically, referring to FIG. 2, the TA may invoke the TUI, and the TUI completes drawing and displaying of the password input screen.

After the user completes information input on the password input screen, the terminal device may further interact with an external server to complete operations such as password verification, money deduction, and transfer, to complete a transaction processing procedure. A password form and a verification manner are not limited in this application.

Figure 4A:
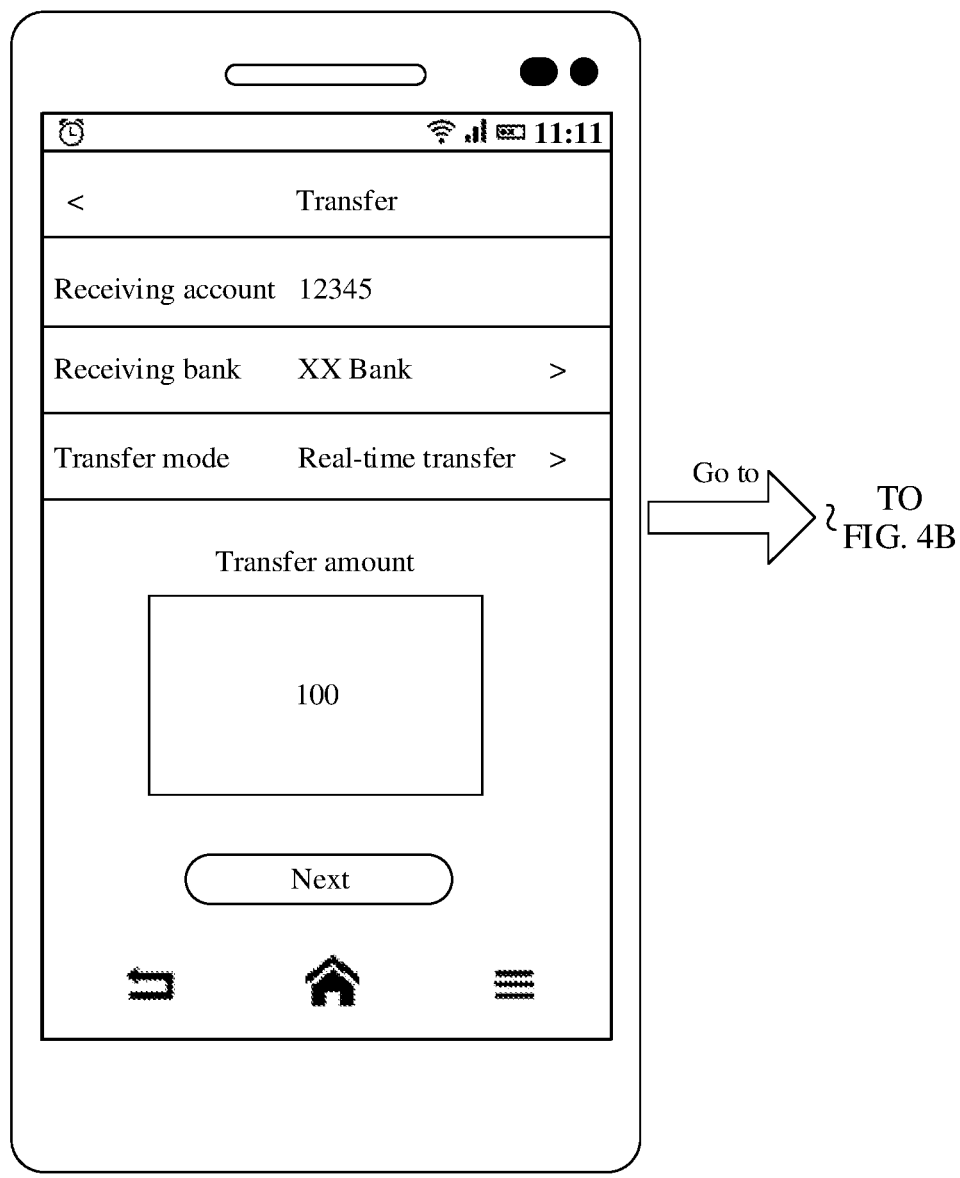
FIG. 4A to FIG. 4C are example diagrams of screens according to an embodiment of this application.
Figure 4B:
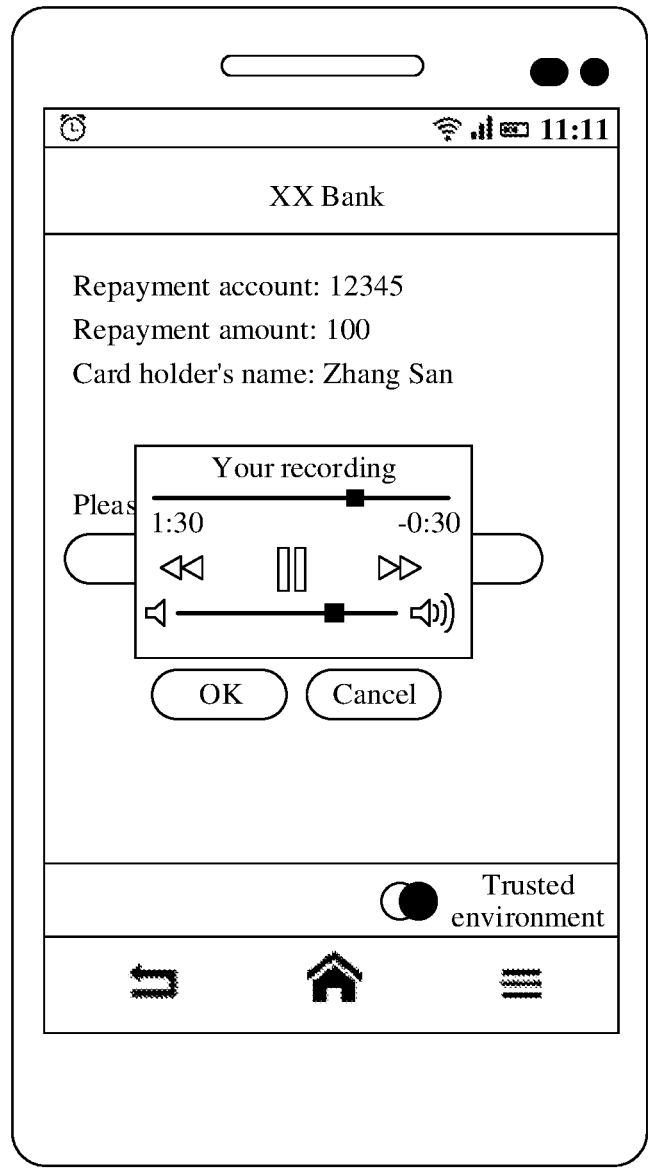
Figure 4C:
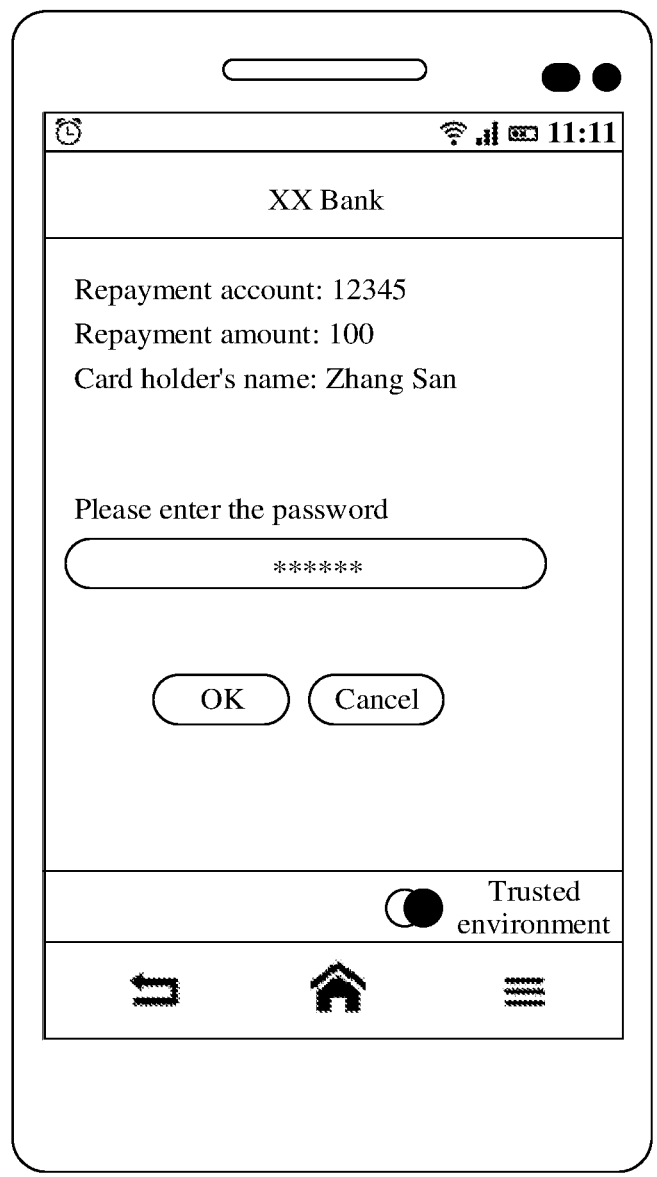

FIG. 4A to FIG. 4C are an example diagram of screens according to this application. As shown in FIG. 4A to FIG. 4C, after a user enters transfer information on a transfer screen and taps a "Next" button, the TA may display a password input screen, and at the same time, a recording information display box is superimposed on the password input screen and a recording starts to be played. If the user does not perform operations such as fast forwarding or pause on the recording, after the TA completes the playing, the recording information display box is closed, and the user can enter the password normally. The user may also perform a fast forwarding operation in the recording information display box. For example, the user directly drags a recording playing time to a playing end time. In this case, the TA may close the recording information display box, and the user enters the password. For another example, the user may tap a pause button, and in this case, the playing of the recording pauses. After the user selects to play the recording again, the TA continues to play the recording and closes the recording information display box after the playing is completed.

It should be noted that a display manner and a display location of the recording information display box in FIG. 4A to FIG. 4C are merely an example. A person skilled in the art may also conceive another manner. This is not limited in this application. In addition, an indication identifier of "Trusted environment" exists in the lower right of the password input screen given in FIG. 4B and FIG. 4C. The indication identifier may exist or may not exist. A type, a display manner, a display location, and the like of the indication identifier are not limited in this application. Some screen elements, screen shapes, housing shapes of a mobile phone, and the like shown in FIG. 1A and FIG. 1B, FIG. 4A to FIG. 4C, and FIG. 7A to FIG. 7D are examples. This is not limited in this application.

S306. The TA adjusts the mode of the audio output device of the terminal device to a second mode, where when the audio output device is in the second mode, the audio output device is controlled by using the CA running in the REE.

In this embodiment, after the TA is started, the TA obtains a right to use the audio output device, so as to improve security in a transaction process. In this case, the CA on the REE side cannot use the audio output device. Therefore, after a transaction processing process is completed, the TA may adjust the mode of the audio output device to the second mode (equivalent to a non-secure mode), and when the mode of the audio output device is the second mode, the REE may control the audio output device.

Specifically, the TA may invoke the first interface, and adjust the mode of the audio output device to the second mode by using the first interface.

In this embodiment, after receiving an instruction triggered by the user for jumping to the password input screen, the terminal device may load the TA on the TEE side, and obtain an audio file from the REE and play the audio file by using the TA, to give a prompt to the user that the terminal device is currently running in a trusted environment. Because content of the audio file is recorded or stored by the user, and content of audio files of terminal devices is different from each other (or has a greater probability of being different), it is very difficult for an attacker to forge the audio file. In addition, even if the audio file can be forged, it is necessary to perform the forging for each terminal device. Therefore, an attack is also costly. Moreover, when the audio file is of a human sound, a voiceprint feature of the human sound is unique and costs of the attack are higher. Therefore, according to the method in this embodiment of this application, difficulty in performing an attack during mobile payment can be greatly increased, a possibility of being attacked in a mobile payment scenario can be greatly reduced, and further, security of the mobile payment can be improved. In addition, in this embodiment, the user is reminded, by playing the audio, that the terminal device is currently running in a trusted environment. Therefore, for special users such as blind users, trustworthiness of the password input screen may also be confirmed by using the method in this embodiment.

Further, in this embodiment, before obtaining and playing the audio file, the TA obtains the right to use the audio output device, by adjusting the mode of the audio output device to a secure mode. When the audio output device is in the secure mode, an application on the REE side cannot invoke the audio output device to play audio. This further prevents the attacker from forging an audio file to play, and further improves security during the mobile payment.

The following further describes the technical solution in the embodiment above from a perspective of interaction between the CA, the TA, and the TEE-side driver.

Figure 5:
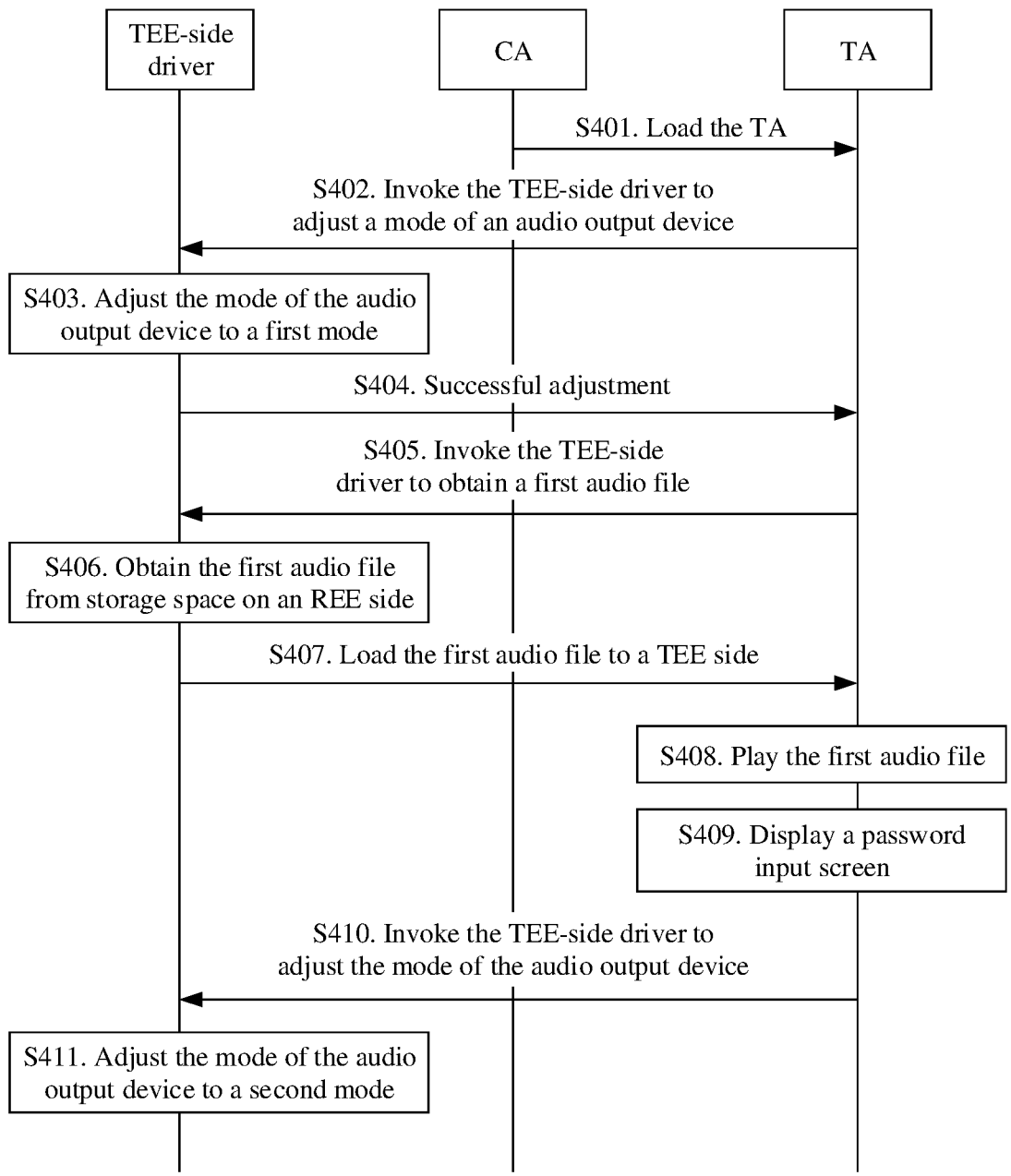
FIG. 5 is an example interaction flowchart of embodiment 1 of a transaction security processing method according to an embodiment of this application.

FIG. 5 is an interaction flowchart of embodiment 1 of a transaction security processing method according to an embodiment of this application.

S401. After receiving a screen jump instruction triggered by a user on a first screen, a CA loads a TA.

S402. After being started, the TA invokes a TEE-side driver running on an REE side.

S403. The TEE-side driver adjusts a mode of an audio output device to a first mode.

S404. The TEE-side driver returns an invocation result of successful adjustment to the TA.

S405. The TA invokes the TEE-side driver again to obtain a first audio file.

S406. The TEE-side driver obtains the first audio file from storage space on the REE side.

S407. The TEE-side driver loads the first audio file to a TEE side.

S408. The TA plays the first audio file, to give a prompt to the user that a terminal device is currently running in a trusted environment.

S409. The TA displays a password input screen.

S410. The TA invokes the TEE-side driver again, to adjust the mode of the audio output device.

S411. The TEE-side driver adjusts the mode of the audio output device to a second mode.

For a specific execution process or variation implementation of the foregoing steps, refer to the foregoing embodiments.

The following is an example of a process of recording an audio file before a mobile transaction.

Figure 6:
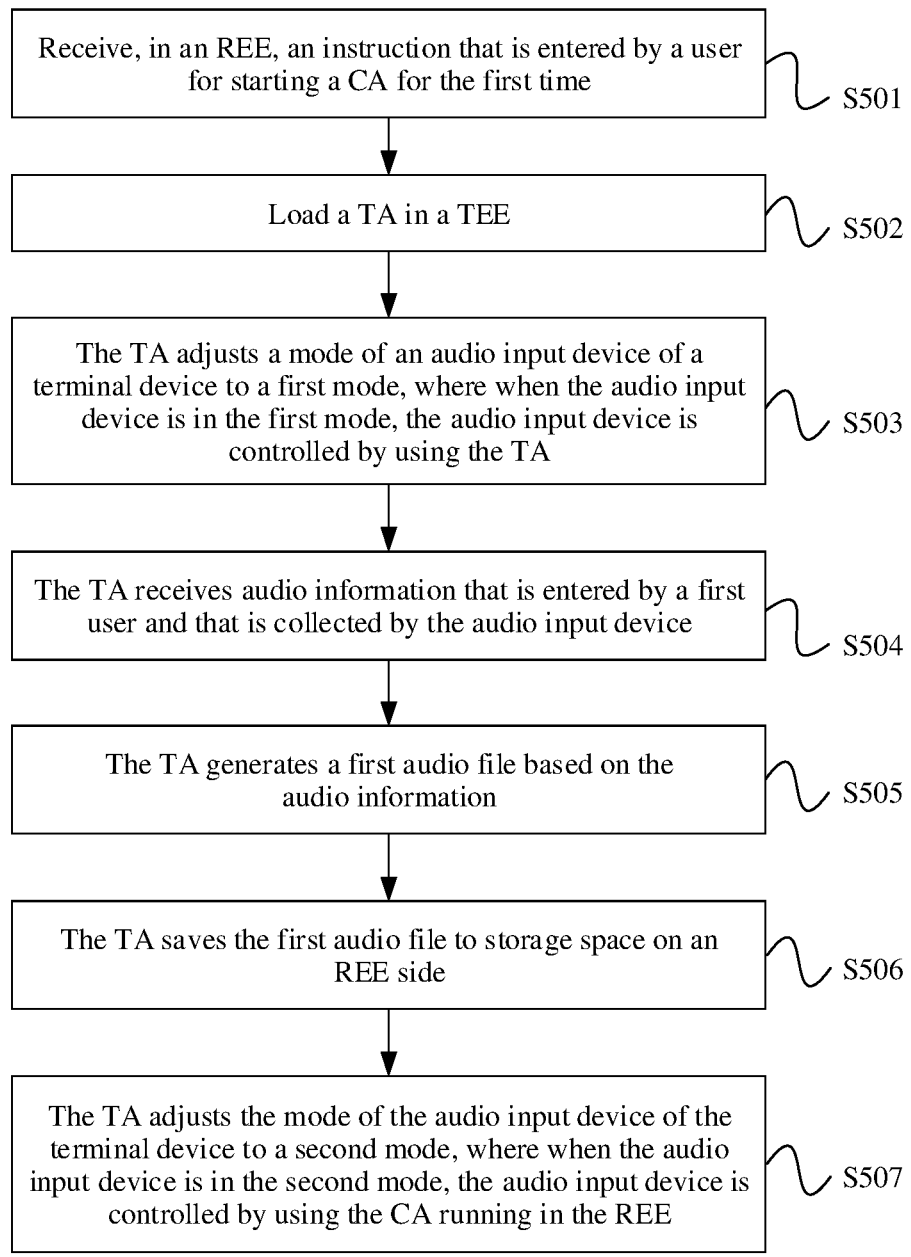
FIG. 6 is an example schematic flowchart of a method for implementing a secure transaction according to an embodiment of this application.
Figure 7A:
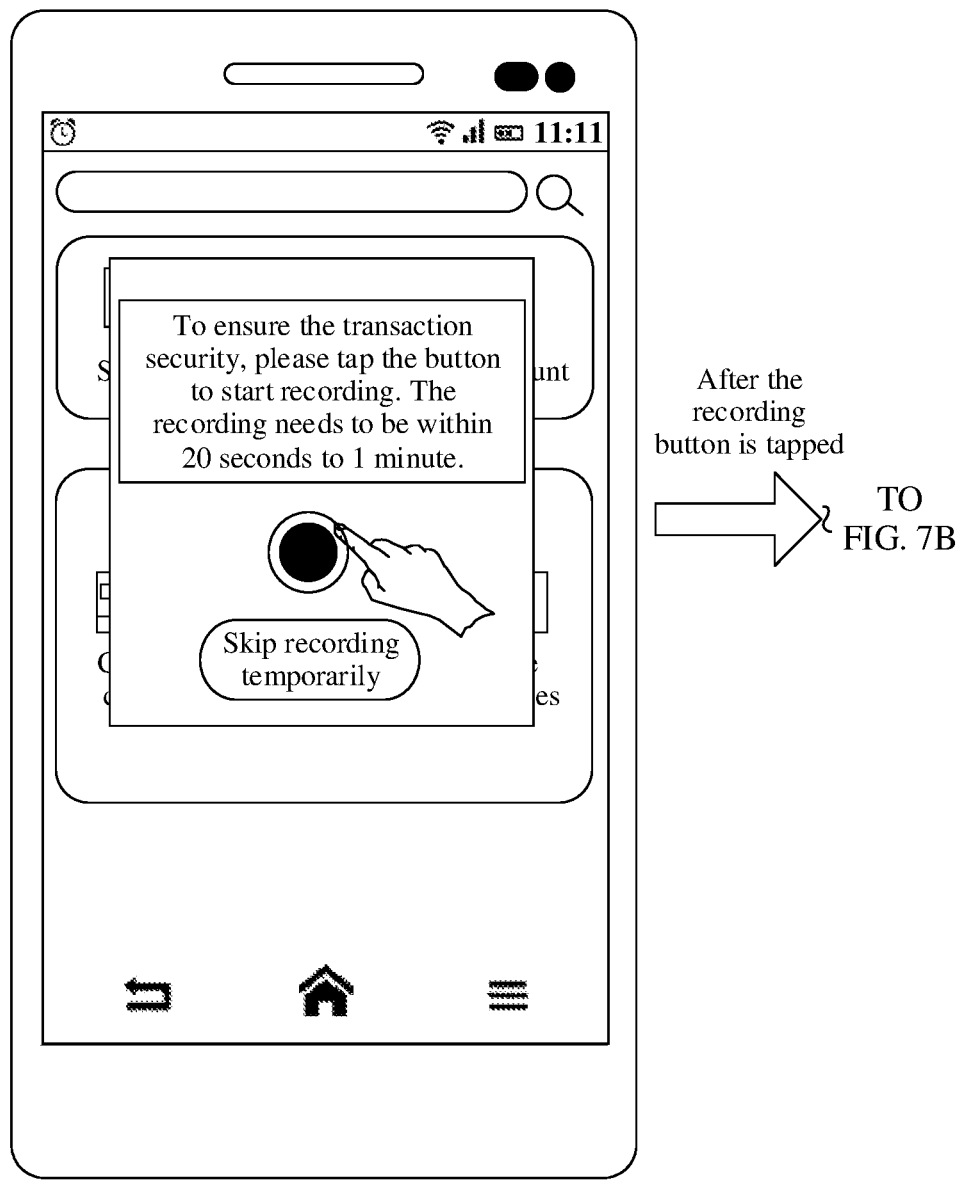
FIG. 7A to FIG. 7D are example diagrams of screens for performing recording when an APP is started for the first time.
Figure 7B:
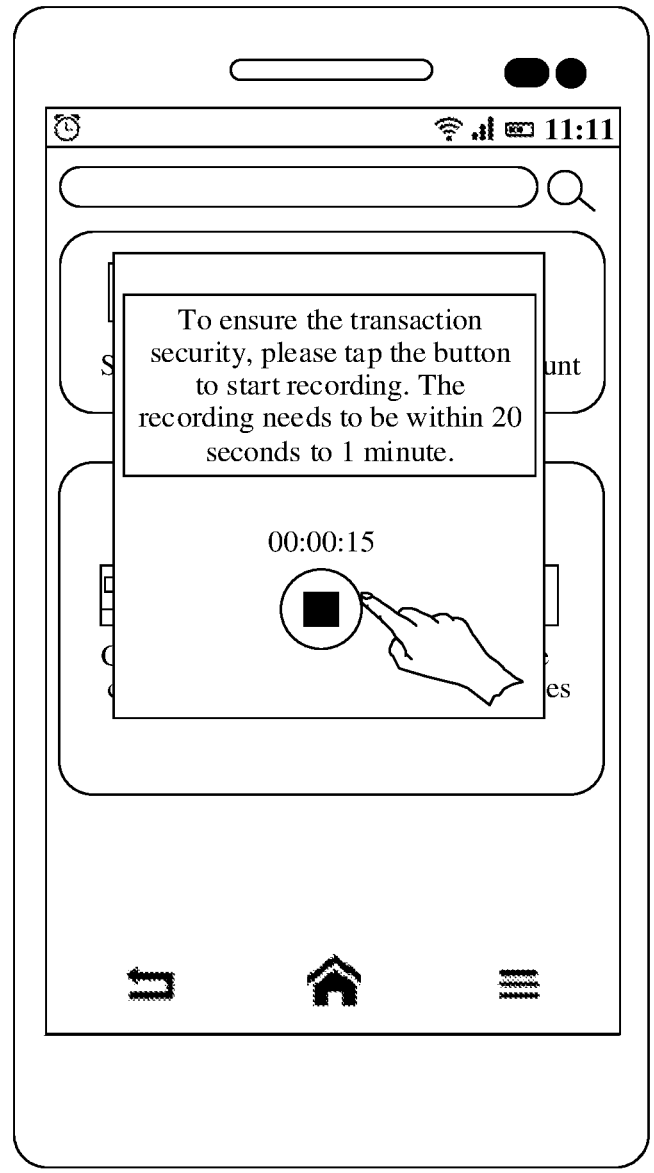
Figure 7C:
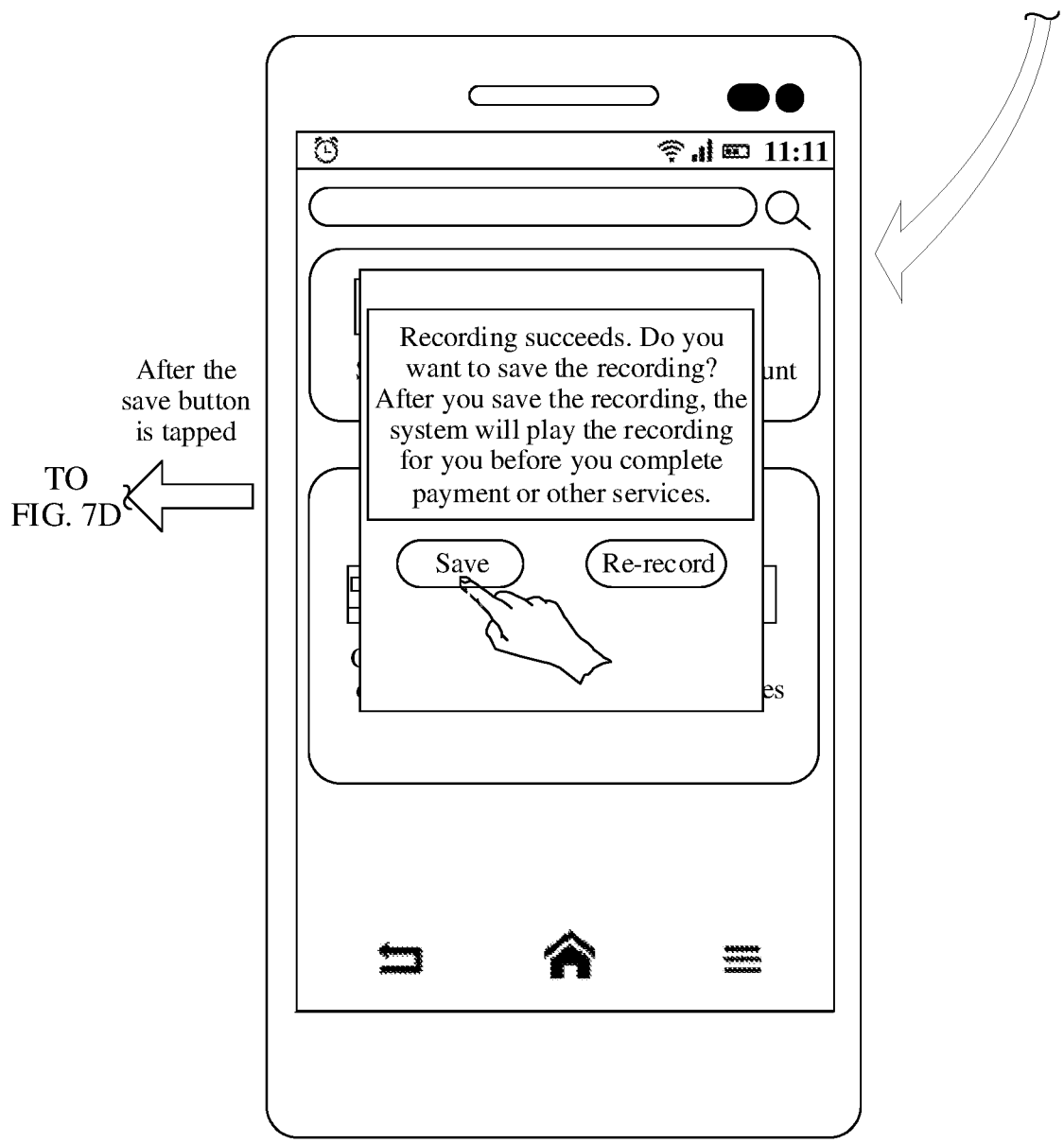
Figure 7D:
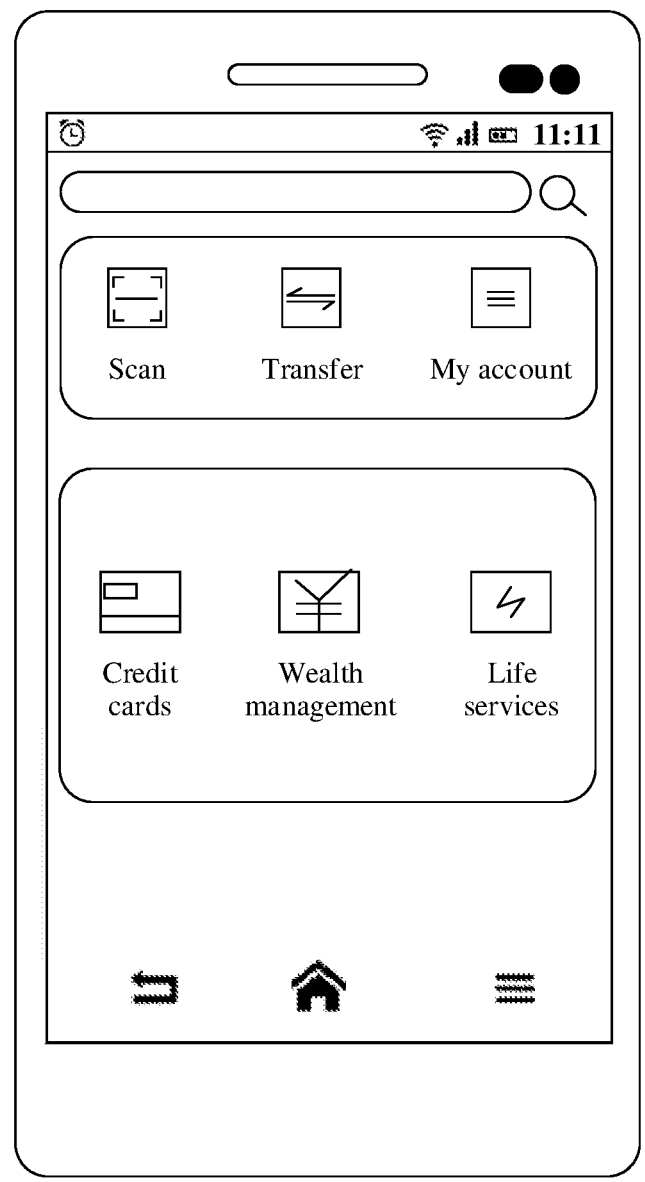

FIG. 6 is a schematic flowchart of a method for implementing a secure transaction according to this application. As shown in FIG. 6, the method includes the following steps.

S501. Receive, in an REE, an instruction that is entered by a user for starting a CA for the first time.

Optionally, the CA may be a CA related to a mobile transaction, such as a bank APP. The user may enter, by tapping an icon of the APP, the instruction for starting the CA for the first time.

In an example scenario in which a user A installs an APP of a bank on a mobile phone, after the installation is completed, the user taps an icon of the APP of the bank on a desktop of the mobile phone, to trigger first startup of the APP of the bank. In this case, the bank APP serving as the CA receives an instruction that is entered by the user for starting the CA for the first time.

S502. Load a TA in a TEE.

In an implementation, for the CA, the instruction for starting the CA for the first time means that the user needs to enter an audio file. Therefore, after receiving the instruction for starting the CA for the first time, the CA loads, by using a TEE-side driver, the TA running in the TEE. The TA starts to run immediately after being loaded.

In addition to triggering loading of the TA and performing of subsequent steps in this embodiment after the instruction for starting the CA for the first time is received, loading of the TA and performing of subsequent steps in this embodiment may also be triggered in other scenarios. For example, audio information is not recorded when the user logs in, for the first time, to the bank APP that serves as the CA, but the audio information is recorded once and before transfer processing needs to be performed. In this scenario, after receiving a transfer instruction of the user, the CA may trigger loading of the TA and performing of subsequent steps in this embodiment.

S503. The TA adjusts a mode of an audio input device of the terminal device to a first mode, where when the audio input device is in the first mode, the audio input device is controlled by using the TA.

In the first mode, the audio input device is controlled only by using the TA, and the CA on an REE side cannot control the audio input device. Therefore, the first mode is a secure mode. In this secure mode, an attacker may be prevented from illegally collecting audio information of the user by using the audio input device.

Specifically, the TA may invoke a first interface to adjust the mode of the audio input device of the terminal device to the first mode.

The first interface includes the TEE-side driver shown in FIG. 2. Specifically, after the CA loads the TA so that the TA starts to run, the TA may invoke the TEE-side driver to trigger the TEE-side driver to adjust the mode of the audio input device to the first mode (in other words, the audio input device is configured to a TEE side), and the TA on the TEE side controls the audio input device.

Further, after completing the adjustment of the mode, the TEE-side driver may return an invocation result of successful adjustment to the TA, or may send error information only when the adjustment fails, or may not send information. This is not limited in this embodiment.

Optionally, in this step, the TA may also adjust the mode of the audio output device to the first mode at the same time, so that after the audio input device collects the audio information recorded by the user, the TA may control the audio output device to play, to the user, the audio information recorded by the user.

S504. The TA receives audio information that is entered by a first user and that is collected by the audio input device.

After the processing in step S503 is performed, the audio input device is in the first mode, and the TA may control the audio input device to collect the audio information entered by the user.

It is assumed that the CA is a bank APP (referred to as an APP below). In a first optional manner, after receiving the instruction for starting the CA for the first time, the APP displays a home page of the APP, and a recording information box is superimposed on the home page of the APP, where recording prompt information is displayed in the information box to give a prompt to the user to enter audio information, and a recording start button is also displayed. The TA starts recording after the user taps the recording start button. After the user completes the recording, the user taps a recording completion button. Then, the user can choose to save the recorded audio information. In a subsequent transaction process, the TA can play the recording, or the user can tap a re-recording button to cancel the recording and start a new recording. After audio recorded by the user is saved, the recording information box is closed.

FIG. 7A to FIG. 7D are an example diagram of screens for performing recording when an APP is started for the first time. As shown in FIG. 7A to FIG. 7D, a user taps a recording start button in a recording information box, and a TA starts recording. After completing the recording, the user taps a recording completion button. Prompt information of successful recording is displayed in the recording information box, and the user taps a save button to save a recording and then the recording information box is closed. The process of the recording is completed.

Referring to FIG. 7A to FIG. 7D, in addition to the recording start button, a "Skip recording temporarily" button may be displayed in the recording information box. If the user does not want to perform recording this time, the user may tap the "Skip recording temporarily" button. After the user taps the button, the process of the recording exits. In a subsequent process, the user may trigger the foregoing recording process from a settings page of the APP. For example, when the user performs a transfer, if the TA confirms that the user has not performed recording, the TA may remind the user to trigger the foregoing recording process from the settings page of the APP, or may directly display a recording information box similar to that in FIG. 7A to FIG. 7D. In other implementations, no prompt is displayed when the CA is started for the first time and login is normal. A recording operation is triggered only from the settings page of the APP or the recording operation is triggered only when a transfer or payment operation is performed for the first time. The foregoing implementations may also be used in a combined or selective manner, or other variation manners that are conceivable by a person skilled in the art. This is not limited in this application.

The audio information entered by the user may be any sound uttered by the user (such as an owner of the terminal, a person with permission for the APP, or another trusted person). The sound can reflect a personalized feature of the user, and therefore can identify that only the user is the owner of the sound. It is very difficult for an attacker to forge the personalized sound pronounced by the user. Therefore, a possibility that an audio file is forged can be greatly reduced. However, this application does not impose a limitation that a recorded sound is necessarily a human sound, and a sound emitted by another non-human entity may also be used as the recording if such a sound also has a personalized feature to some extent. One purpose proposed by this application is to increase difficulty in counterfeiting audio files, but not to avoid counterfeiting completely. Therefore, uniqueness of different audio files is not strictly limited.

In addition, in this embodiment, the user is reminded, by playing audio, that the terminal device is currently running in a trusted environment. Therefore, for special users such as blind users, trustworthiness of the password input screen may also be confirmed by using the method in this embodiment.

After collecting the audio information entered by the user, the audio input device reports the audio information to the TA.

S505. The TA generates a first audio file based on the audio information.

S506. The TA saves the first audio file to storage space on the REE side.

Optionally, the TA may invoke the first interface to save the first audio file to the storage space on the REE side. In an implementation, referring to FIG. 2, the first interface may be the TEE-side driver shown in FIG. 2, and the TA invokes the TEE-side driver to transmit the first audio file to the TEE-side driver, so as to trigger the TEE-side driver to save the first audio file to the storage space on the REE side.

Optionally, to further ensure security of audio recorded by the user, the TA may encrypt the audio file, save, on the TEE side, a key generated during the encryption, and then invoke the first interface to save the encrypted audio file to the storage space on the REE side.

Optionally, after completing the saving of the first audio file, the first interface may return an invocation result of successful saving to the TA.

S507. The TA adjusts the mode of the audio input device of the terminal device to a second mode, where when the audio input device is in the second mode, the audio input device is controlled by using the CA running in the REE.

In this embodiment, after the TA is started, the TA obtains a right to use the audio input device, so as to improve security in a process of recording the audio information by the user. In this case, the CA on the REE side cannot use the audio input device. Therefore, after the user completes the recording of the audio information, the TA may adjust the mode of the audio input device to the second mode, and when the mode of the audio input device is the second mode, the REE may control the audio input device.

Optionally, the TA may invoke the first interface, and adjust the mode of the audio output device to the second mode by using the first interface.

In addition, if the TA adjusts the mode of the audio output device to the first mode at the same time, in this step, the TA may adjust the mode of the audio output device to the second mode at the same time, and the REE controls the audio output device.

The following further describes the technical solution in embodiment 2 above from a perspective of interaction between the CA, the TA, and the TEE-side driver.

Figure 8:
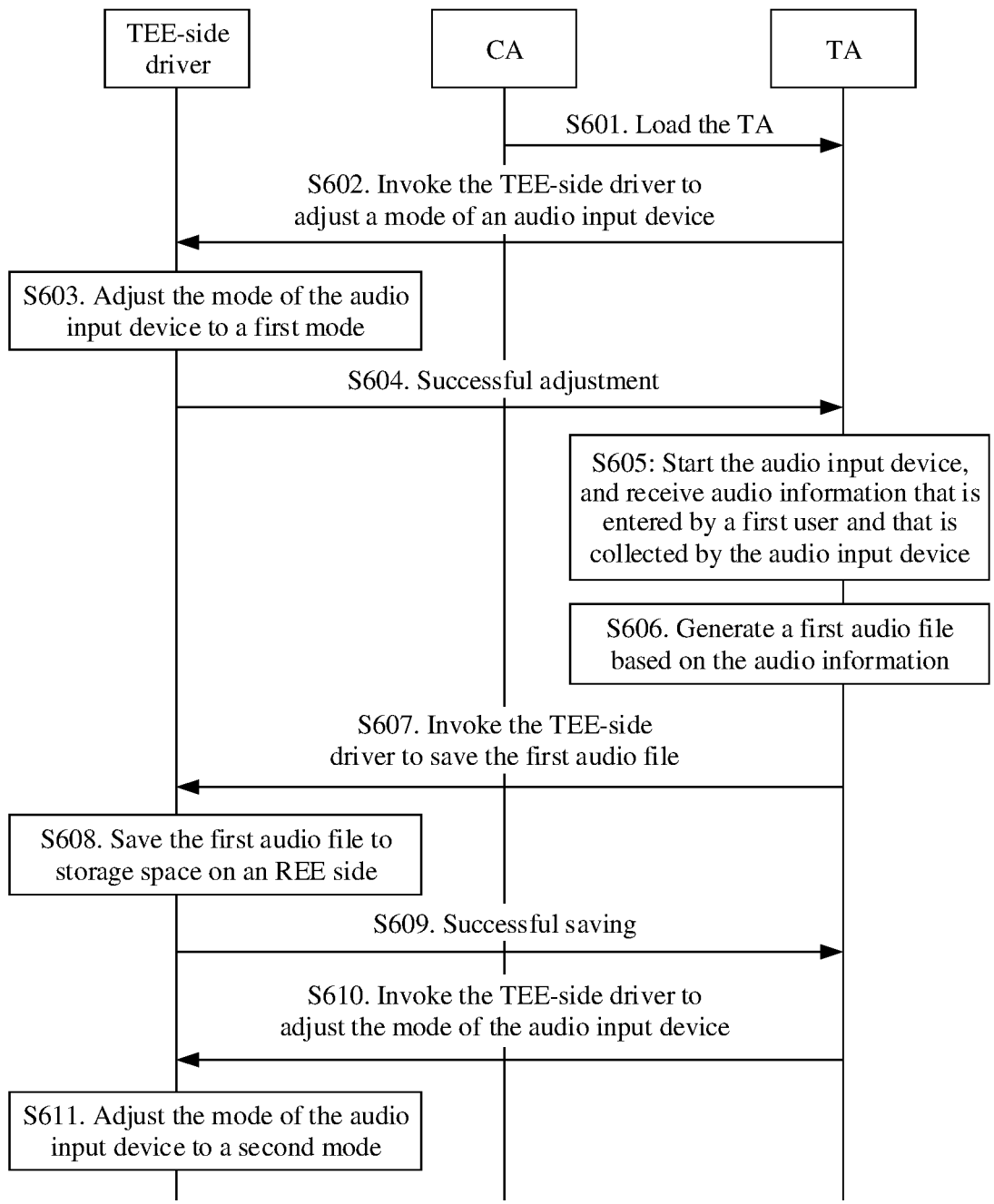
FIG. 8 is an example interaction flowchart of embodiment 2 of a transaction security processing method according to an embodiment of this application.

FIG. 8 is an interaction flowchart of embodiment 2 of a transaction security processing method according to an embodiment of this application.

S601. After receiving an instruction entered by a user for starting a CA for the first time, the CA loads a TA.

S602. After being started, the TA invokes a TEE-side driver running on an REE side.

S603. The TEE-side driver adjusts a mode of an audio input device to a first mode.

S604. The TEE-side driver returns an invocation result of successful adjustment to the TA.

S605. The TA starts the audio input device, and receives audio information that is entered by a first user and that is collected by the audio input device.

S606. The TA generates a first audio file based on the audio information.

S607. The TA invokes the TEE-side driver again to save the first audio file.

S608. The TEE-side driver saves the first audio file to storage space on the REE side.

S609. The TEE-side driver returns an invocation result of successful saving to the TA.

S610. The TA invokes the TEE-side driver again, to adjust the mode of the audio input device.

S611. The TEE-side driver adjusts the mode of the audio input device to a second mode.

For a specific execution process or variation implementation of the foregoing steps, refer to the foregoing embodiments.

Figure 9:
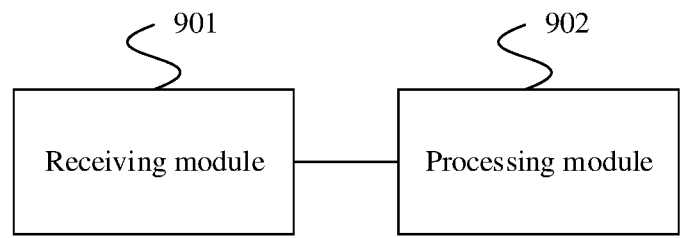
FIG. 9 is an example structural diagram of modules of a transaction security processing apparatus according to an embodiment of this application.

FIG. 9 is a structural diagram of modules of a transaction security processing apparatus according to an embodiment of this application. The apparatus may be a terminal device, or may be an apparatus that can support the terminal device in implementing the method provided in the embodiments of this application. For example, the apparatus may be an apparatus in the terminal device or a chip system. An internal system architecture of the terminal device may be the system architecture shown in FIG. 1A and FIG. 1B. To be specific, the terminal device includes an REE and a TEE, where the REE is based on an REE operating system, and the TEE is based on a TEE operating system. An application layer of the TEE may include a TA. As shown in FIG. 9, the apparatus includes a receiving module 901 and a processing module 902. In this embodiment of this application, the chip system may include a chip, or may include a chip and another discrete device.

The receiving module 901 runs in the REE of the terminal device. The receiving module 901 is configured to receive a screen jump instruction triggered by a user on a first screen, where the screen jump instruction is used for jumping to a second screen.

The processing module 902 runs in the TEE of the terminal device. The processing module 902 is configured to: load the TA, and obtain a first audio file from storage space on an REE side and play the first audio file by using the TA, where the first audio file is used to represent that the terminal device is currently running in a trusted environment, and the processing module 902 is further configured to display the second screen generated by using the TA.

In a possible implementation, the processing module 902 is further configured to:

adjust, by using the TA, a mode of an audio output device of the terminal device to a first mode, where when the audio output device is in the first mode, the audio output device is controlled by using the TA; and control, by using the TA, the audio output device to play the first audio file.

In this possible implementation, the processing module 902 is specifically configured to:

invoke a first interface by using the TA, to adjust the mode of the audio output device of the terminal device to the first mode.

The first interface is an interface in the REE.

In a possible implementation, the processing module 902 is specifically configured to:

invoke the first interface by using the TA to obtain the first audio file from the storage space on the REE side.

The first interface includes an interface in the REE.

In a possible implementation, the processing module 902 is specifically configured to:

obtain, by using the TA, the encrypted first audio file from the storage space on the REE side;

decrypt, by using the TA, the encrypted first audio file by using a key stored on the TEE side, to obtain the decrypted first audio file; and play the decrypted first audio file by using the TA.

In a possible implementation, the processing module 902 is further configured to:

adjust, by using the TA, the mode of the audio output device of the terminal device to a second mode, where when the audio output device is in the second mode, the audio output device is controlled by using the CA running in the REE.

In a possible implementation, the processing module 902 is further configured to: receive, by using the TA, audio information that is entered by a first user and that is collected by an audio input device, where the audio input device is in the first mode; generate, by using the TA, the first audio file based on the audio information; and save, by using the TA, the first audio file to the storage space on the REE side.

In this possible implementation, the processing module 902 is specifically configured to:

invoke the first interface by using the TA, and save the first audio file to the storage space on the REE side.

The first interface includes an interface in the REE.

In this possible implementation, the processing module is further configured to: encrypt, by using the TA, the first audio file by using the key to obtain the encrypted first audio file;

save the key to the storage space on the TEE side by using the TA; and save the encrypted first audio file to the storage space on the REE side.

In a possible implementation, an audio feature of the first audio file is a voice feature of the user.

Module division in this embodiment of this application is an example, is merely logical function division, and may be other division in actual implementation. In addition, function modules in the embodiments of this application may be integrated into one processor, or each of the modules may exist alone physically, or two or more modules are integrated into one module. The integrated module may be implemented in a form of hardware, or may be implemented in a form of a software functional module.

Figure 10:
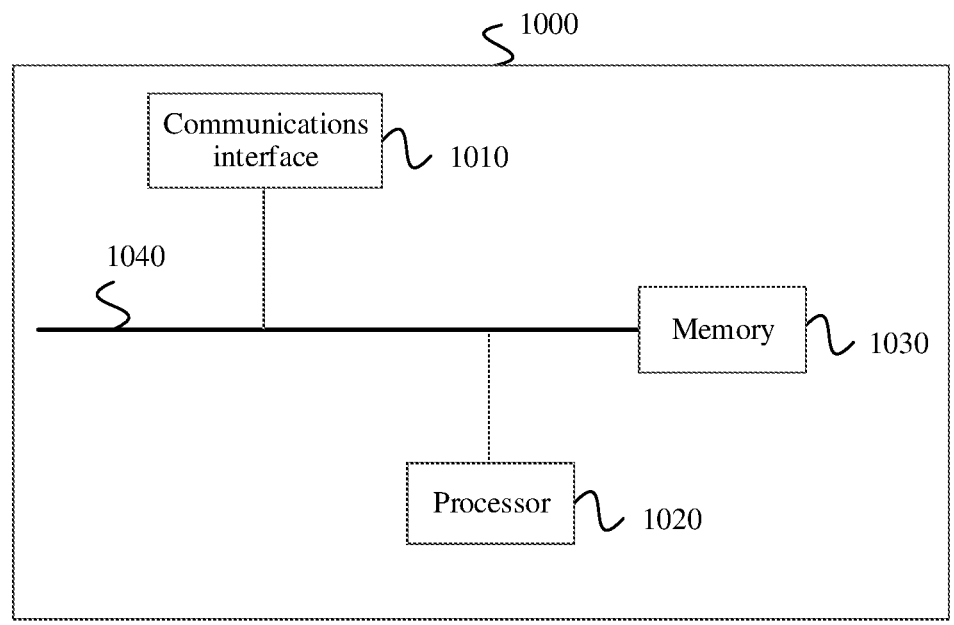
FIG. 10 is an example schematic block diagram of a terminal device 1000 according to an embodiment of this application.

FIG. 10 is a schematic block diagram of a terminal device 1000 according to an embodiment of this application. The terminal device 1000 is configured to implement functions of the terminal device in the foregoing method. An internal system architecture of the terminal device may be the system architecture shown in FIG. 1A and FIG. 1B. To be specific, the terminal device includes an REE and a TEE, where the REE is based on an REE operating system, and the TEE is based on a TEE operating system. An application layer of the TEE may include the TA. As shown in FIG. 10, the terminal device 1000 includes at least one processor 1020. The processor 1020 may support the system architecture shown in FIG. 1A and FIG. 1B. Further, in this embodiment, the processor 1020 is configured to implement the functions of the terminal device in the method provided in the embodiments of this application. For example, the processor 1020 may receive, in the REE, a screen jump instruction triggered by a user on a first screen, where the screen jump instruction is used for jumping to a second screen; and load a TA in the TEE, and obtain a first audio file from storage space on an REE side and play the first audio file by using the TA, and display the second screen generated by using the TA. For details, refer to detailed descriptions in the method example.

The terminal device 1000 may further include at least one memory 1030, configured to store a program instruction and/or data. The memory 1030 is coupled to the processor 1020. Coupling in this embodiment of this application is an indirect coupling or a communication connection between apparatuses, units, or modules, may be in an electrical form, a mechanical form, or another form, and is used for information exchange between the apparatuses, the units, or the modules. The processor 1020 may operate in collaboration with the memory 1030. The processor 1020 may execute the program instruction stored in the memory 1030. At least one of the at least one memory may be included in the processor.

The terminal device 1000 may further include a communications interface 1010, configured to communicate with another device by using a transmission medium, so that an apparatus in the terminal device 1000 can communicate with the another device. In this embodiment of this application, the communications interface may be an interface in any form that can perform communication, for example, a module, a circuit, a bus, or a combination thereof. Optionally, the communications interface 1010 may be a transceiver. For example, the another device may be a network device. The processor 1020 receives and sends data through the communications interface 1010, and is configured to implement the method performed by the terminal device in the foregoing method embodiment.

In this embodiment of this application, a specific connection medium between the communications interface 1010, the processor 1020, and the memory 1030 is not limited. In this embodiment of this application, the memory 1030, the processor 1020, and the communications interface 1010 are connected through a bus 1040 in FIG. 10, and the bus 1040 is represented by a thick line in FIG. 10. A connection manner between other components is schematically described, and is not limited thereto. The bus may be classified into an address bus, a data bus, a control bus, and the like. For ease of representation, only one thick line is used to represent the bus in FIG. 10, but this does not mean that there is only one bus or only one type of bus.

In this embodiment of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in the embodiments of this application. The general-purpose processor may be a microprocessor, any conventional processor, or the like. The steps of the method disclosed with reference to the embodiments of this application may be directly performed and completed by a hardware processor, or may be performed and completed by a combination of hardware and a software module in the processor.

In this embodiment of this application, the memory may be a non-volatile memory, for example, a hard disk drive (HDD) or solid-state drive (SSD), or may be a volatile memory, for example, a random access memory (RAM). The memory is any other medium that can be used to carry or store expected program code in a form of an instruction or a data structure and that can be accessed by a computer, but is not limited thereto. The memory in this embodiment of this application may alternatively be a circuit or any other apparatus that can implement a storage function, and is configured to store a program instruction and/or data.

All or some of the methods in the embodiments of this application may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of the present technology are generated. The computer may be a general-purpose computer, a dedicated computer, a computer network, a network device, user equipment, or another programmable apparatus. The computer instructions may be stored in a computer-readable storage medium, or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

It is clear that a person skilled in the art can make various modifications and variations to this application without departing from the scope of this application. If these modifications and variations of this application fall within the scope of the claims of this application and their equivalent technologies, this application is also intended to cover these modifications and variations.

What is claimed is:

1. A transaction security processing method, applied to a terminal device that includes a rich execution environment (REE) and a trusted execution environment (TEE), the method comprising:
   receiving, in the REE, a screen jump instruction triggered by a user on a first screen, wherein the screen jump instruction is used for jumping to a second screen, and the second screen is displayable only in the TEE;
   entering the TEE and loading a trusted application (TA) in the TEE;
   obtaining a first audio file from storage space on an REE side and playing the first audio file by using the TA, wherein the first audio file is pre-stored by the user and represents that the terminal device is currently running in a trusted environment; and
   displaying the second screen generated by using the TA.

2. The method according to claim 1, wherein before obtaining the first audio file from the storage space on the REE side and playing the first audio file by using the TA, the method further comprises:
   adjusting a mode of an audio output device of the terminal device to a first mode by using the TA, wherein when the audio output device is in the first mode, the audio output device is controlled by using the TA, and playing the first audio file by using the TA comprises controlling, by using the TA, the audio output device to play the first audio file.

3. The method according to claim 2, wherein adjusting the mode of the audio output device to the first mode comprises:
   invoking a first interface, that includes an interface in the REE, by using the TA to adjust the mode of the audio output device of the terminal device to the first mode.

4. The method according to claim 1, wherein obtaining the first audio file from the storage space on the REE side comprises:
   invoking a first interface, that includes an interface in the REE, by using the TA to obtain the first audio file from the storage space on the REE side.

5. The method according to claim 1, wherein obtaining the first audio file from the storage space on the REE side comprises:
   obtaining an encrypted first audio file from the storage space on the REE side by using the TA, wherein playing the first audio file by using the TA comprises decrypting the encrypted first audio file by using the TA by using a key stored on a TEE side to obtain a decrypted first audio file; and
   playing the decrypted first audio file by using the TA.

6. The method according to claim 2, wherein after displaying the second screen generated by using the TA, the method further comprises:
   adjusting the mode of the audio output device of the terminal device to a second mode by using the TA, wherein when the audio output device is in the second mode, the audio output device is controlled by using a client application (CA) running in the REE.

7. The method according to claim 1, further comprising:
   receiving, by using the TA, audio information entered by a first user and collected by an audio input device, wherein the audio input device is in a first mode;
   generating the first audio file based on the audio information by using the TA; and
   saving the first audio file to the storage space on the REE side by using the TA.

8. The method according to claim 7, wherein saving the first audio file to the storage space comprises:
   invoking a first interface, that includes an interface in the REE, by using the TA to save the first audio file to the storage space on the REE side.

9. The method according to claim 7, wherein saving the first audio file to the storage space comprises:
   encrypting the first audio file by using the TA by using a key to obtain the encrypted first audio file;
   saving the key to the storage space on the TEE side by using the TA; and
   saving the encrypted first audio file to the storage space on the REE side by using the TA.

10. The method according to claim 1, wherein an audio feature of the first audio file includes a voice feature of the user.

11. A terminal device, comprising:
   a processor; and
   a memory configured to store computer readable instructions that, when executed by the processor, cause the processor to:
      receive, in a rich execution environment (REE), a screen jump instruction triggered by a user on a first screen, wherein the screen jump instruction is used for jumping to a second screen, and the second screen is configured for display in a trusted execution environment(TEE);
enter the TEE and load a trusted application (TA) in the TEE;
obtain a first audio file from storage space on an REE side and play the first audio file by using the TA, wherein the first audio file is pre-stored by the user and represents that the terminal device is currently running in a trusted environment; and
display the second screen generated by using the TA.

12. The terminal device according to claim 11, wherein the processor is further caused to:
adjust a mode of an audio output device of the terminal device to a first mode by using the TA, wherein when the audio output device is in the first mode, the audio output device is controlled by using the TA; and
control, by using the TA, the audio output device to play the first audio file.

13. The terminal device according to claim 12, wherein the processor is further caused to:
invoke a first interface, that includes an interface in the REE, by using the TA to adjust the mode of the audio output device of the terminal device to the first mode.

14. The terminal device according to claim 11, wherein the processor is further caused to:
invoke a first interface, that includes an interface in the REE, by using the TA to obtain the first audio file from the storage space on the REE side.

15. The terminal device according to claim 11, wherein the processor is further caused to:
obtain an encrypted first audio file from the storage space on the REE side by using the TA; and
decrypt the encrypted first audio file by using the TA by using a key stored on a TEE side to obtain a decrypted first audio file; and
play the decrypted first audio file by using the TA.

16. The terminal device according to claim 12, wherein the processor is further caused to:
adjust the mode of the audio output device of the terminal device to a second mode by using the TA, wherein when the audio output device is in the second mode, the audio output device is controlled by using a client application (CA) running in the REE.

17. The terminal device according to claim 11, wherein the processor is further caused to:
receive, by using the TA, audio information that is entered by a first user and that is collected by an audio input device, wherein the audio input device is in a first mode;
generate the first audio file based on the audio information by using the TA; and
save the first audio file to the storage space on the REE side by using the TA.

18. A non-transitory storage medium having computer readable instructions that, when executed by one or more processors, cause the one or more processors to provide execution comprising:
receiving, in a rich execution environment (REE), a screen jump instruction triggered by a user on a first screen, wherein the screen jump instruction is used for jumping to a second screen, and the second screen is configured for display in a trusted execution environment(TEE); and
entering the TEE and loading a trusted application (TA) in the TEE;
obtaining a first audio file from storage space on an REE side and playing the first audio file by using the TA, wherein the first audio file is pre-stored by the user and represents that the terminal device is currently running in a trusted environment; and
displaying the second screen generated by using the TA.

19. The non-transitory storage medium according to claim 18, wherein the one or more processors further being caused to provide execution comprising:
adjusting a mode of an audio output device of the terminal device to a first mode by using the TA, wherein when the audio output device is in the first mode, the audio output device is controlled by using the TA; and
controlling, by using the TA, the audio output device to play the first audio file.

20. The non-transitory storage medium according to claim 18, wherein obtaining the first audio file from the storage space on the REE side comprises:
obtaining an encrypted first audio file from the storage space on the REE side by using the TA, wherein playing the first audio file by using the TA comprises decrypting the encrypted first audio file by using the TA by using a key stored on a TEE side to obtain a decrypted first audio file; and
playing the decrypted first audio file by using the TA.

* * * * *